United States Patent
Lamphere (10) Patent No.: US 11,852,284 B2
(45) Date of Patent: Dec. 26, 2023

(54) TENSIONING AID FOR POWER TRANSMISSION

(71) Applicant: Brian Lamphere, Gillette, WY (US)

(72) Inventor: Brian Lamphere, Gillette, WY (US)

( * ) Notice: Subject to any disclaimer, the term of this patent is extended or adjusted under 35 U.S.C. 154(b) by 359 days.

(21) Appl. No.: 17/447,427

(22) Filed: Sep. 12, 2021

(65) Prior Publication Data
US 2021/0404597 A1 Dec. 30, 2021

Related U.S. Application Data

(63) Continuation-in-part of application No. 16/523,897, filed on Jul. 26, 2019, now abandoned.

(60) Provisional application No. 62/714,062, filed on Aug. 2, 2018.

(51) Int. Cl.
F16M 11/20 (2006.01)
F16M 11/22 (2006.01)

(52) U.S. Cl.
CPC ......... F16M 11/2085 (2013.01); F16M 11/22 (2013.01); *F16M 2200/027* (2013.01)

(58) Field of Classification Search
CPC ......... F16M 11/2085; F16M 2200/027; F16M 7/00; F16M 11/2092; F16M 11/22; F16H 2007/0891; F16H 7/02; F16H 11/18; F16H 7/14
USPC .... 474/136, 114, 123, 107; 248/429, 346.06
See application file for complete search history.

(56) References Cited

U.S. PATENT DOCUMENTS

| | | | | |
|---|---|---|---|---|
| 2,762,662 A * | 9/1956 | Sloyan | ...................... | H02K 5/26 384/49 |
| 3,652,044 A * | 3/1972 | Manross | .................. | F16M 7/00 248/657 |
| 4,986,797 A * | 1/1991 | Nemirovsky | ......... | F16H 19/025 474/101 |
| 5,975,480 A * | 11/1999 | Schaefer | .................. | F16M 7/00 248/657 |
| 7,493,825 B2 * | 2/2009 | Hewitt | ..................... | F16C 23/00 73/161 |
| 8,910,917 B1 * | 12/2014 | Bees | ......................... | F16M 7/00 248/676 |
| 9,803,726 B2 * | 10/2017 | Lindsay | ..................... | F16H 7/14 |
| 9,973,056 B2 * | 5/2018 | Copanas | .................. | H02K 5/26 |
| 2004/0065162 A1 * | 4/2004 | Iida | .......................... | B23Q 5/34 74/89.2 |

(Continued)

FOREIGN PATENT DOCUMENTS

WO WO-2015187085 A1 * 12/2015 ........... F16H 7/0848

*Primary Examiner* — Michael R Mansen
*Assistant Examiner* — Stephen A Reed (57) ABSTRACT

A base and movable platform are connected by a linearly extendable member, so that a motor may be adjustably located at a desired distance from other machinery which receives power. A motor mounted on such a movable platform may be linearly displaced so that belts, chain, or silent chain or the like may be adjusted to operate at a desired tension. In another embodiment, a motor driving a gear train may be adjusted so that the depth of engagement of meshed teeth and the allowable backlash between a driving gear on the motor and a driven gear may be adjusted and controlled. An automatic belt tension control system may be constructed by adding a tension sensor and a control module configured to maintain operating tensions within a preferred range and optionally to emit alarms or command a shutdown if an unsafe condition is detected.

16 Claims, 7 Drawing Sheets

(56) References Cited

U.S. PATENT DOCUMENTS

| | | | |
|---|---|---|---|
| 2005/0037878 A1* | 2/2005 | Pierjok | F16H 7/14 |
| | | | 474/101 |
| 2015/0280514 A1* | 10/2015 | Norris | H02K 5/26 |
| | | | 474/115 |
| 2017/0108094 A1* | 4/2017 | Greer | F16H 7/14 |
| 2021/0404597 A1* | 12/2021 | Lamphere | F16M 11/22 |

* cited by examiner

TENSIONING AID FOR POWER TRANSMISSION

CROSS-REFERENCE TO RELATED APPLICATION

This non-provisional utility patent application is a continuation-in-part of non-provisional utility patent application Ser. No. 16/523,897 "Tensioning Aid for Power Transmission," filed 29 Jul. 2019 and currently pending.

Non-provisional utility patent application Ser. No. 16/523,897 "Tensioning Aid for Power Transmission," filed 29 Jul. 2019 claims the benefit of and priority to US provisional patent application Ser. No. 62/714,062 "Tensioning Aid for Power Transmission" filed 2 Aug. 2018 and now expired.

The entire contents of U.S. provisional patent application Ser. No. 62/714,062 "Tensioning Aid for Power Transmission" filed 2 Aug. 2018 and non-provisional utility patent application Ser. No. 16/523,897 "Tensioning Aid for Power Transmission," filed 29 Jul. 2019 are hereby incorporated into this document by reference.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The invention relates to a movable platform for mechanical power sources.

BACKGROUND

Mechanical power sources are connected to machinery by means of various sorts of power transmission equipment.

BRIEF SUMMARY

It is often desirable to adjust the distance between a mechanical power source and a machine receiving and consuming power developed by the power source. A primary objective of the invention is to secure the mechanical power source at a predetermined or desired position with respect to power receiving machinery and power transmission equipment connected therebetween.

Another objective of the invention is to provide means for re-positioning a power source with respect to power receiving machinery. A corollary objective of the invention is to securely maintain the power source in its desired position while resisting vibration, mechanical shocks, tensions within power transmission equipment attached to it, or other forces which might displace the power source from its desired position.

BRIEF DESCRIPTION OF THE DRAWINGS

A further understanding of the nature and advantages of particular embodiments may be realized by reference to the remaining portions of the specification and the drawings, in which like reference numerals are used to refer to similar components. When reference is made to a reference numeral without specification to an existing sub-label, it is intended to refer to all such multiple similar components.

DETAILED DESCRIPTION OF CERTAIN EMBODIMENTS

While various aspects and features of certain embodiments have been summarized above, the following detailed description illustrates a few exemplary embodiments in further detail to enable one skilled in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

In this application the use of the singular includes the plural unless specifically stated otherwise, and use of the terms "and" and "or" is equivalent to "and/or," also referred to as "non-exclusive or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

The invention is a slidable assembly comprising a base and movable platform connected by a linearly extendable member, so that a power source for reciprocating or rotary power may be adjustably located at a desired distance from other machinery which receives power developed by the source as delivered by power transmission equipment.

Typical machinery which relies on rotary power as an input include pumps, shredders, fans or blowers, crushing machines, conveyers, slitting and slotting mills, corn spellers and other food processing equipment, pelletizers, and flywheel-driven equipment for intermittent operations such as drop forges, trip hammers, and brake presses.

Although sometimes powered by direct drive or reduction gearing, these sorts of machines are usually driven by continuous belts which are fitted around pulleys or sheaves on a motor and on the machine. Sprockets and chains or silent chain are also used between a motor and an input shaft of a machine. For belt and chain driven systems speed reduction or increases are engineered by selecting a drive sheave or sprocket having a different pitch diameter than the driven sheave or sprocket. Belt-drive systems are popular in industry because in the event of an anomaly which jams a driven machine to a rapid or instant halt, the belts may slip on the stalled sheave so the drive motor is not similarly halted abruptly and is saved from damage.

For convenience in this specification, the word "belt" will also include chain and silent chain used in power transmission equipment, and the word "sheave" will also include any sort of pulley, sprocket, drum or hub in contact with a "belt" in a power transmission as broadly defined above. A "motor" in this specification is defined as any source of rotary or reciprocating power and may even include an internal or external combustion engine.

Figure 1:
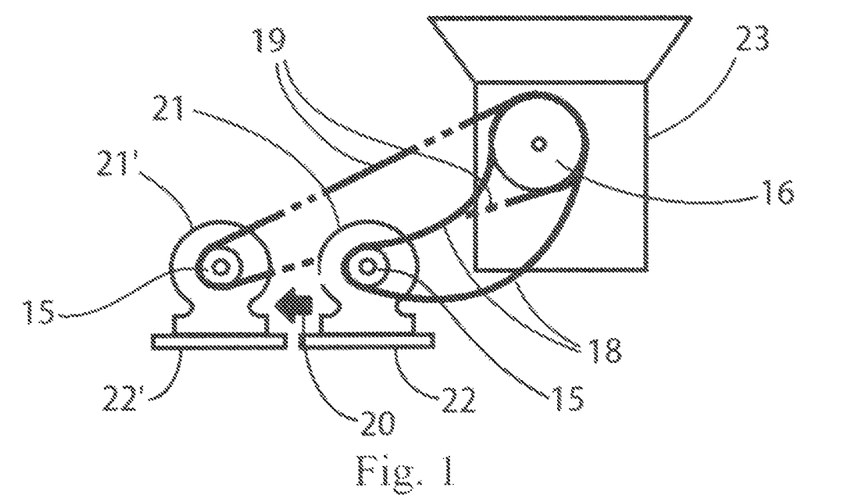
FIG. 1 shows a power source, a driven machine, and a transmission belt connected therebetween to illustrate the problem addressed by the invention.

Referring to FIG. 1, a machine [23] is operated by supplying it with rotary power at a pulley or sheave [16] which is affixed to an input shaft of the machine.

A motor [21] is mounted to a platform [22] and has a sheave [15] which drives a belt [18.] During installation it is convenient to position a drive motor closer to a driven machine than it will be in operation, so that a drive belt may be fitted with ease over sheaves and idlers. After installation, the invention displaces the platform to a new position [22'] and with it the motor also moves to a new position [21'.] The direction of this substantially linear motion is indicated by the arrow [20.]

In its operating position, the drive belt assumes a taut condition indicated by phantom lines [19.] However, running time, temperatures, or severe service may cause a properly tensioned belt to stretch and slacken back to a loose condition like the belt of [18.] Loose belts slip and accrue abrasive wear, shortening service life and also fail to fully transmit the motive power picked up by the motor sheave, resulting in loss of energy efficiency in operating the machine [23.]

The invention addresses these problems by mounting a motor on a slidable platform for adjustment by means of linear displacement of a motor from a driven sheave so as to take up any belt slack at any time.

Figure 2A:
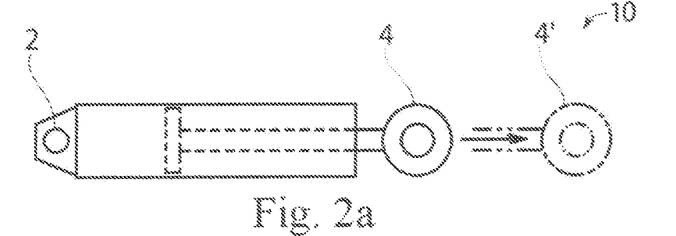
FIG. 2a shows an abstract depiction of one kind of linearly extensible member in accordance with the invention, showing a retracted and an extended position.

The invention includes one or more linearly extendable members which operate between a stationary or immobilized base and a movable platform to which the motor is secured. An extendable member in this specification is a load-bearing device which is adjustable in length between a fixed end and an extendable end, and withstands compressive or tensile loads applied along a longitudinal axis. FIG. 2a shows a linearly extensible member [10] which in this illustration is a hydraulic or a pneumatic actuator. A linearly extendable member in accordance with the invention has first and second ends and first and second connection affordances respectively [2 and 4] at those ends, and means for increasing or decreasing the linear distance between those first and second ends. In this figure, the second connection affordance is shown in a retracted position at [4,] and an extended position at [4'.]

Figure 2B:
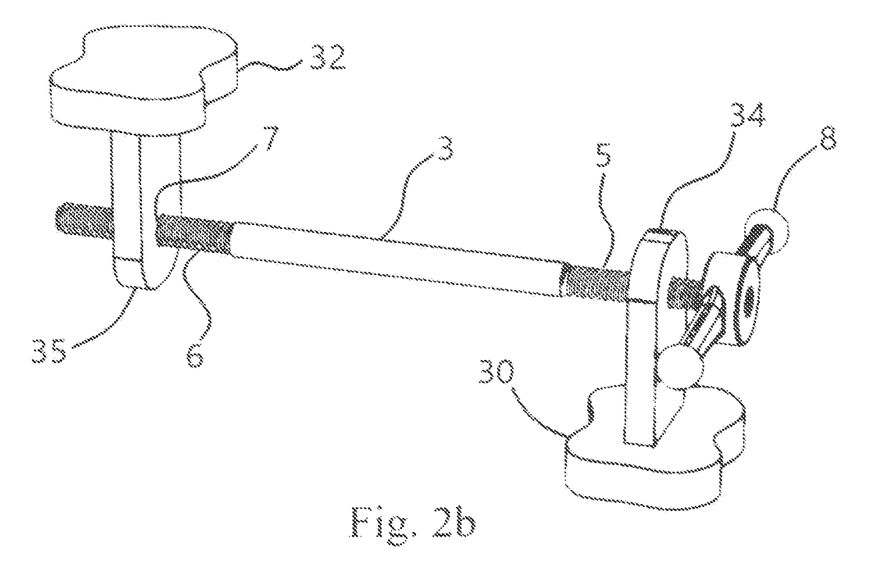
FIG. 2b shows another embodiment of a linearly extensible member in accordance with the invention.

Another type of linear extendable member is shown in FIG. 2b, where a rod [3] has first and second connection affordances which in this example are oppositely threaded ends, one being left-hand threaded and the other being right-hand threaded. The base [30] includes a first attachment site [34] having complementary threads to the first connection affordance [5] for connecting to the first end of the linearly extensible member, and the slidable platform [32] includes a second attachment site [34] having opposite threads [7] to the first connection affordance. This second end of the linearly extendable member connects to the second attachment site [35] which is part of or attached to the slidable platform. A crank handle [8] is coupled to the treaded rod so that turning the crank either draws the connection affordances together or apart, which causes the platform to slide with respect to the base.

Figure 3:
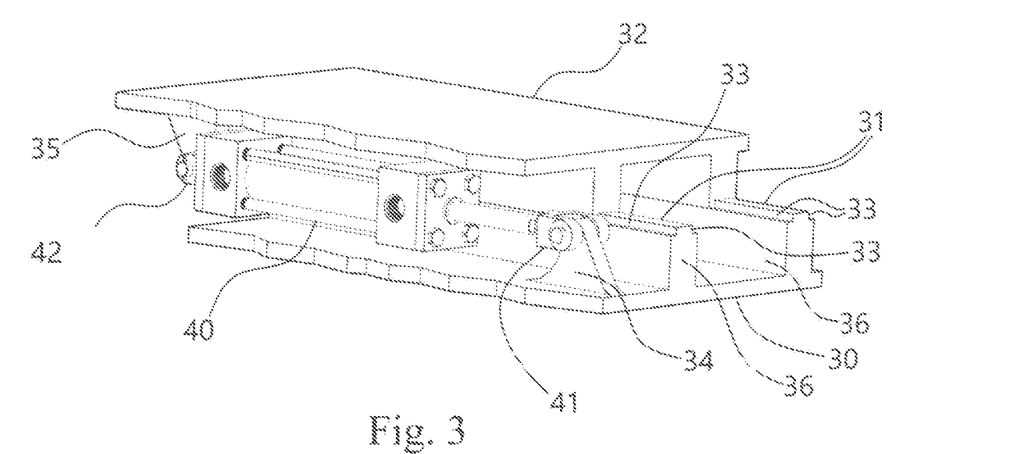
FIG. 3 shows an oblique view of a base, movable platform, and linearly extensible member in accordance with the invention.

FIG. 3 shows a more components of the invention in context. In this oblique view, a base [30] and a movable platform [32] connected by a linearly extensible member [40] in accordance with the invention. The first end of the linearly extensible member has a first connection affordance [41] which is connected to a first attachment site [34] of the base, and the second end of the linearly extensible member has a second connection affordance [42] which is connected to a second attachment site [35] of the base.

The base has one or more rails [36] which each include a slide surface [31] defining and extending in a slide direction, plus first and second guide surfaces [33] which are opposed to each other. Although the base only needs one first guide surface opposed to one second guide surface anywhere else on the base, in this embodiment each rail has its own pair of opposed guide surfaces, which extend along the slide direction. In this specification, "opposed surfaces" may face towards each other or away from each other, and may be parallel surfaces or surfaces which are inclined towards ear other or sloped away from each other.

Figure 4:
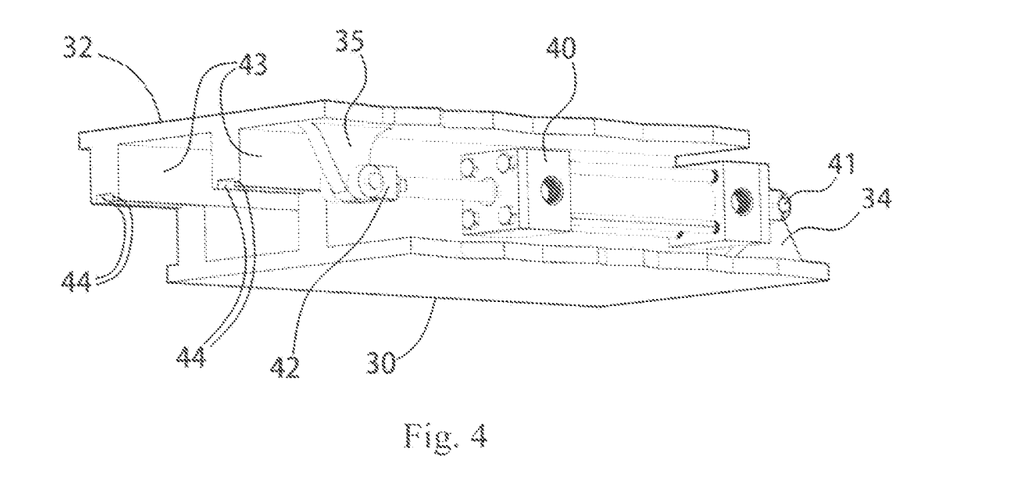
FIG. 4 shows another oblique view of a base, a movable plat-form, and linearly extensible member in accordance with the invention.

FIG. 4 shows another oblique view of this example embodiment of the invention. The platform [32] is slidably coupled to the base [30,] and the platform includes a slide surface complementary to and in contact with the slide surface of the rail of the base [31 in FIG. 3.] The platform also has underside rails or joists [43,] and the bottom portion of each joist in this example has pairs of guided surfaces [44] which are complementary to and in contact with guide surfaces of the base. More specifically, a first guided surface of the platform is complementary to and in contact with a first glide surface of the base, and a second guided surface of the platform is complementary to and in contact with a second glide surface of the base.

The linearly extendable member [40] with its first and second connection affordances [41, 42] are attached to first and second attachment sites [34, 35] as in the previous figure. However, note that the definitions of first and second ends and first and second connection affordances allow for the component in this figure to be installed opposite or end-for-end from how it is shown in FIG. 3 and still accord with the definitions of this specification.

Figure 5A:
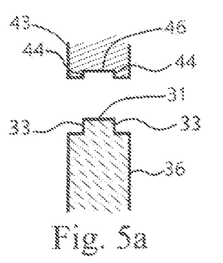
FIGS. 5a through 5j show cross section views of rails and opposed surfaces in accordance with the invention.

FIGS. 5a through 5j show cross section views of rails [36] and joists [43] and opposed guide surfaces [33] in accordance with the invention. FIG. 5a shows a tongue and groove embodiment in which a slide surface [31] is a top surface of a tongue, and the guide surfaces [33] are the left and right sides of the tongue, which oppose each other. The platform has its own slide surface [46] in contact with the slide surface of the rail of the base, and opposed guided surfaces [44] which are in contact with the guide surfaces of the rail of the base. Although the glide surface of the platform and its guided surfaces are shown in these figures to reside on discrete joists protruding below the underside surface of the platform, it is also possible to form these features of the platform directly into the underside of the platform, so that the platform itself rides on rails of the base. Conversely, it is also possible for the platform to have joists and guided features, and the base features to which they are complementary need not reside on upwardly extending rails but may themselves be formed directly into the base.

Figure 5B:
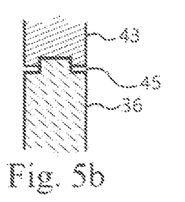

FIG. 5b shows the groove feature of a joist [43] of the platform mated atop the tongue feature of a rail [36] of the base, showing that a gap [45] may exist between other features which are not the slide surfaces of the platform and base.

Figure 5C:
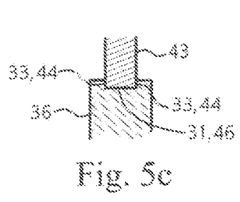

FIG. 5c shows another example of complementary slide features [31] and [46] respectively of a base and platform. In this example, a guided surface which spans the full width of a joist [43] is received into a groove in the base [36] so that the sidewalls of the groove are the guide surfaces [33] of the base and the sides of the joist [44] are the guided surfaces of the platform.

Figure 5D:
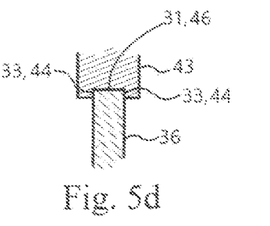

FIG. 5d shows an opposite arrangement to FIG. 5c which is also in accordance with the invention. The rail [36] of the base fits into an underside groove in a joist [43] or such a groove milled into the underside of the platform. The sidewalls of the groove in the platform are its guided surfaces [44,] and the sides [33] of the rail are the opposed guide surfaces of the base. The top surface of the rail is its slide surface [31] and the (inverted) floor of the groove is the slide surface [46] of the platform.

Figure 5E:
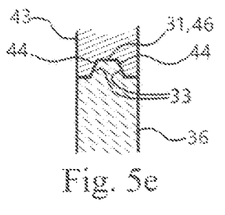

FIG. 5e shows another example of a sliding interface between the base and the platform. In this case the angled sidewalls of the tongue form the guide surfaces [31] of the rail [36] of the base, while complementary angled sidewalls of the underside groove in the joist [43] of the platform form guided surfaces [44] which bestride the guide surfaces of the rail. As in previous figures, the top surface of the rail is its slide surface [31] and the (inverted) floor of the groove is the slide surface [46] of the platform.

Figure 5F:
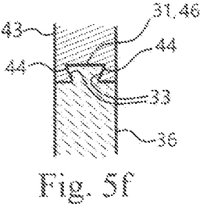

FIG. 5f shows a dovetail joint between the base and the platform. The outwardly angled sidewalls of the dovetail form the guide surfaces [31] of the rail [36] of the base, while complementary angled sidewalls of the underside dovetail groove in the joist [43] of the platform form guided surfaces [44] which lockingly engage the guide surfaces of the rail. As in previous figures, the top surface of the rail is its slide surface [31] and the (inverted) floor of the groove is the slide surface [46] of the platform.

Figure 5G:
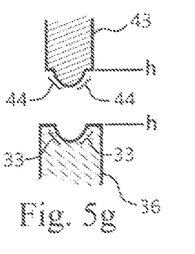

Arcuate grooves and ridges may also be used to guide the slidable interface of the invention. Arcuate grooves and ridges may have cross sections that comprise circular arcs, or elliptical, parabolic or hyperbolic segments. FIG. 5g shows a joist [43] and a rail [36] having complementary, slightly parabolic sections. For arcuate segments within this specification, a horizontal reference 'h' may be defined perpendicular either to a plane of symmetry defined by a joist or rail, or perpendicular to the direction of force or weight of the platform supported by the slidable interface. With the horizontal reference 'h' defined, portions of an arcuate groove or ridge which are effective for guiding [33] or being guided [44] are those where a tangent plane placed upon the surface (or a tangent line in the case of these cross section figures) would intersect the horizontal reference 'h' at an angle of 15° or greater. In this figure, the effective and opposed portions of the guide surfaces of the rail and the guided surfaces of the joists are indicated as proximal to the brackets { and }.

Figure 5H:
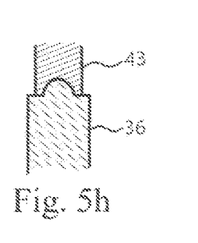

FIG. 5h shows the joist [43] of FIG. 5g resting atop the rail [36] and the guided surfaces of the underside groove in the joist bestride the guide surfaces of the ridge or bead in the rail.

Figure 5I:
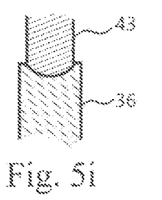
Figure 5J:
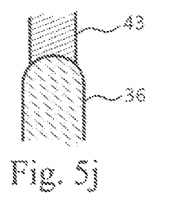

Although the profiles shown in FIGS. 5a through 5h all have at least some portion which is parallel to or defining of a horizontal reference, FIGS. 5i and 5j show that it is also within the scope of the invention for the sliding interface between the base and the platform to be composed of arcuate sections alone. FIG. 5i shows an arcuate groove cut into a rail [36] of the invention, into which is received a joist [43] whose entire underside surface has an arcuate profile complementary to the groove in the rail. In FIG. 5j, both the rail top surface and the complementary joist underside surface are entirely composed of arcuate profiles even though one member is wider than the other. FIGS. 5i and 5j also show that the rail and joists of the invention need not be of equal widths, and either component may be the wider of the two.

Figure 6A:
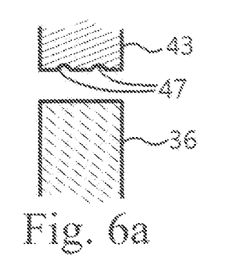
FIG. 6a shows a cross section of a slide surface in accordance with the invention which includes runnels.

FIG. 6a shows a cross section of a slide surface in accordance with the invention which includes runnels for receiving and retaining grease or heavy oil, but preferably a lubricant which exists as a gel or pasty consistency at the operating temperature of the work environment. Although runnels here are shown in an underside sliding surface portion of a platform, they may be cut into a sliding surface of the base. It is preferred to cut the runnels into underside surfaces so that over time stored lubricant will drop by gravity onto the active surfaces of the sliding interface and keep them lubricated. It is less preferred to have runnels in both a slide surface and an underside slide surface which rests atop it, because machining inaccuracies may cause flat sliding surfaces between the runnels to collide at their edges and produce chatter while sliding, and also to shed slivers of material which may migrate and contaminate the lubricated sliding interfaces.

Figure 6B:
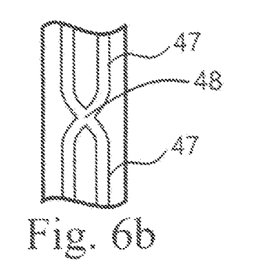
FIG. 6b shows a bottom view of a slide surface having runnels which intersect and communicate with each other.

FIG. 6b shows a bottom view of a slide surface having runnels in which a first runnel intersects with and communicates with a second runnel. If more than one runnel is cut into a sliding surface, having their paths cross improves lubrication by allowing the lubricant to migrate among the entire network of interconnected runnels.

Figure 7A:
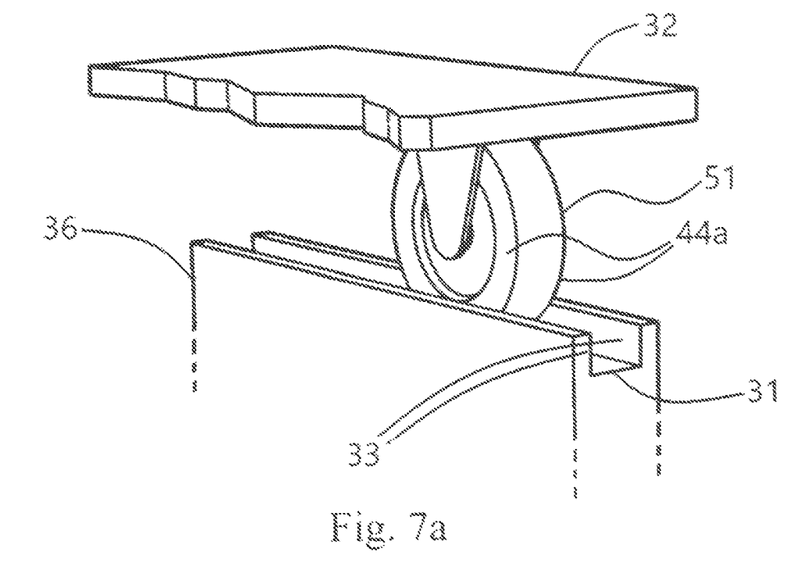
FIG. 7a shows an alternative in accordance with the invention in which a rail includes a trough and the platform includes a wheel which rolls within the trough.

FIG. 7a shows an alternative embodiment in accordance with the invention in which a rail [36] of a base includes a trough and the platform [32] includes a wheel [51] which rolls within the trough. The wheel should be retained within a rigid caster or bearing support or the like, so that it is free to roll but not free to pivot or steer itself astray. The wheel may be flat or crowned and may be solid or comprise a hub and a tire. The wheel rolls along the floor of the groove, which in the event of sliding of the wheel rather than rolling of the wheel functions as a slide surface [31,] but may also be referred to as a rolling surface for the wheel, and the sidewalls of the grooves interact with the sides of the wheel to act as opposed guide surfaces [33] guiding the sidewalls of the wheels, which act as guided surfaces [44a] for the platform.

Figure 7B:
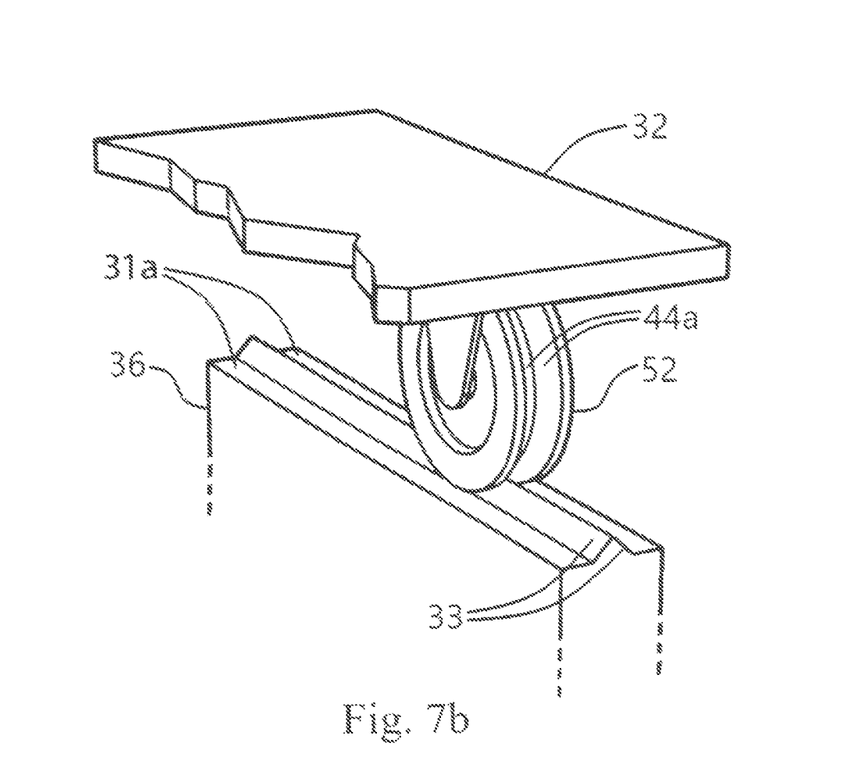
FIG. 7b shows another alternative in accordance with the invention in which a rail includes a ridge and the platform includes a wheel with a groove that bestrides the opposed surfaces of the ridge.

FIG. 7b shows another alternative in accordance with the invention in which a rail [36] includes a ridge and the platform [32] includes a wheel [52] with a groove that bestrides the opposed surfaces of the ridge. Although a rounded groove may be used to ride atop a rounded bead similar to the rounded features in FIG. 5h, another preferred embodiment uses a V-groove in the wheel and a triangle which may be an isosceles triangle for the ridge on the rail. The wheel may contact the flats [31a] of a rail or the base, but preferably the contact interface is limited to the V-groove surfaces of the wheel in contact with the anhedral surfaces of the triangular ridge. In such a configuration, the anhedral surfaces of the triangular ridge are the opposed guide surfaces [33] and the inward facing conical surfaces of the V-groove in the wheel are the opposed guided surfaces [44a] of the platform. Surfaces complementary to anhedral surfaces of a triangular ridge may also be called dihedral surfaces. A long, V-shaped (i.e, dihedral) groove on the underside of a joist may bestride and slide along the complementary anhedral surfaces of a triangular ridge, so that the anhedral surfaces function as the guide surfaces and the dihedral surfaces act as the guided surfaces. In this specification a triangular ridge may be simply called an anhedral, and a V-groove may be called a dihedral groove.

In another alternative embodiment of the invention, a motor mounted on such a movable platform may be linearly displaced so that belts, chain, or silent chain or the like connecting the motor to a machine consuming rotary power may be adjusted to operate at a desired tension. In another alternative embodiment in accordance with the invention, a motor driving a gear train may be adjusted so that the depth of engagement of meshed teeth and the allowable backlash between a driving gear on the motor and a driven gear may be adjusted and controlled.

In a yet further alternative embodiment in accordance with the invention, an automatic control system may be incorporated into the invention, especially using a negative feedback loop, to create an automatic belt tension control system whereby a desired tension may be sensed by a tension sensor to generate a tension signal. The tension signal is then converted to a tension value by analogue or digital means. The tension value is compared to one or more reference values stored in a control module, including at least a set point value and optionally including other values such as one or more alarm values, a minimum value, an operating value, and a maximum value as thresholds for the control module to send system commands to other components to within the automatic tension control system. When the tension value exceeds a reference value which is an alarm value, a signal is emitted from the control module and sent to an annunciator. When a tension value decreases below a minimum value or exceeds a maximum value, a signal is emitted from the control module to change a length of a linearly extendable member within the system. When a tension value arrives at an operating value, signals commanding extension or retraction of a linearly extendable member may be cancelled, and alarm annunciators may also be cancelled.

Figure 8A:
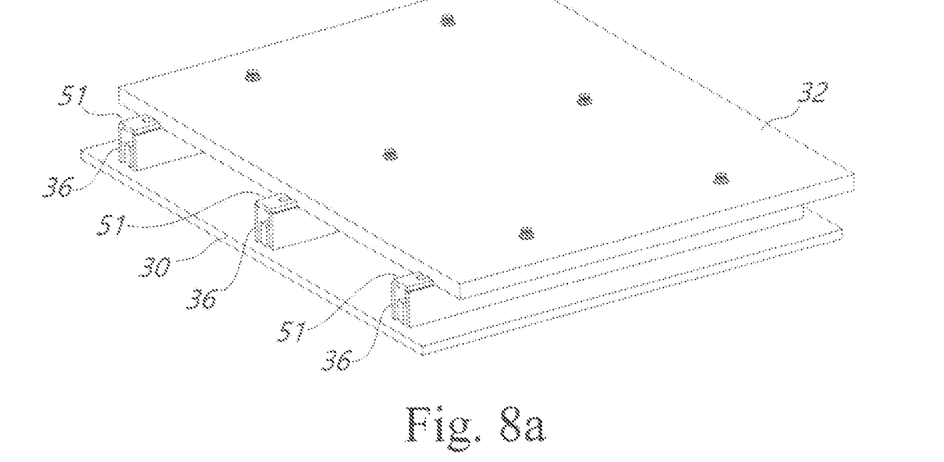
FIG. 8a shows another embodiment of a slidable assembly in accordance with the invention.

FIG. 8a shows another embodiment of a slidable assembly in accordance with the invention. This embodiment includes a base [30] and a sliding platform [32.] The base includes at least one joist but in this embodiment shown there are three joists [36] which all extend along a sliding direction. Each joist has a support surface [51] which bears at least a portion of the weight of the platform and the equipment secured to the platform. The joists are hollow, with each having a cavity extending in the sliding direction. Support for features disclosed in this exemplary embodiment is seen in the photos supplied as an appendix to the provisional application specification filed 2 Aug. 2018.

Figure 8B:
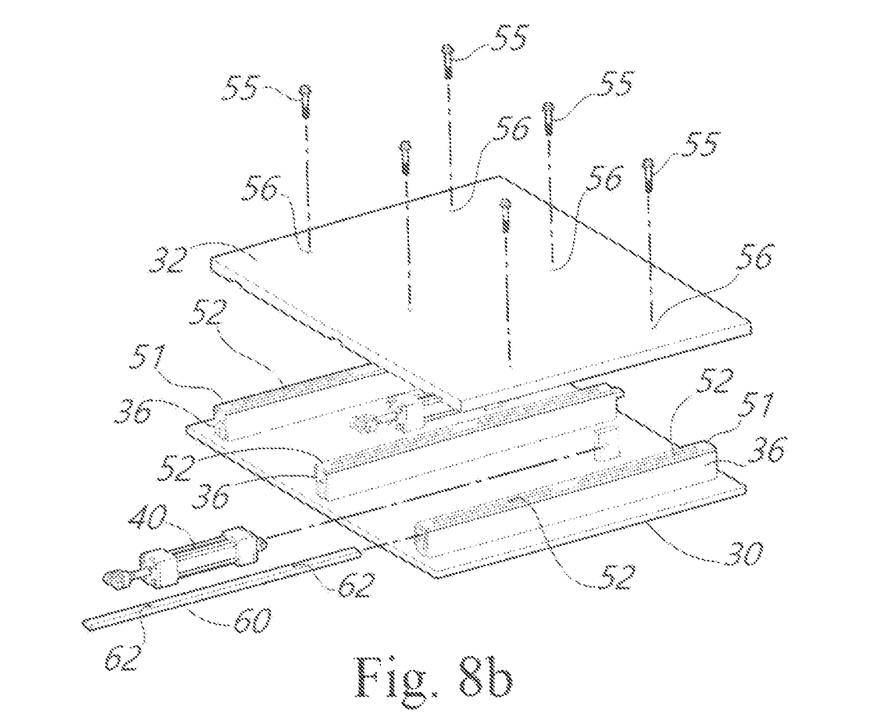
FIG. 8b shows the slidable assembly of FIG. 8a with some components exploded.

FIG. 8b shows the slidable assembly of FIG. 8a with some components exploded. The hollow joists [36] on the base [30] support the platform [32] upon their support surfaces [51.] The underside of the platform includes channels which are seen in this view as hidden lines or broken lines. Other hidden lines are omitted in this view. The channels are supported surfaces which extend in the sliding direction, and include through apertures [56] which receive fasteners [55.] The supported surfaces of the channels rest atop the support surfaces [51] of the joists.

Among other optional features which may be included but are omitted in this view, the channels on the underside of the platform may include runnels such as those illustrated in FIG. 6b, and the runnels may reside on support surfaces or supported surfaces or both. Where a plurality of runnels are used, they may run parallel to each other or a first runnel among a plurality of runnels, may intersect and communicating with a second runnel or other runnels.

The support surfaces are perforated by at least one slot [52] which extends along the slide direction, and the slots communicate with the cavity in their joists. Each joist cavity contains a clamp bar [60] deposited therein which has at least one fastener receiving aperture [62] for each slot in the joist. In a preferred embodiment, fasteners which include external threads such as screws or bolts are passed through the fastener receiving apertures in the supported surfaces of the platform and pass through the slots in the joist so that they are received within complementary internally threaded fastener receiving apertures in the clamp bars. When equipment operation causes drive belts or chains to slacken, these fasteners are loosened so that the platform may be slid along the sliding direction to tighten up the drive components, and then the fasteners are re-tightened to draw up the clamp bar up against the underside surface of the lintel portion of the joist. Tension in the fasteners squeezes the clamp bar to the joist and also squeezes the supported surfaces of the platform against the support surfaces of the joists. The combination of all these squeezing forces creates great static friction to secure the platform in its new position and hold the drive components in proper tension.

To assist with displacing the platform if it and the motive equipment mounted atop the platform are too ponderous to move safely by hand, the slidable assembly preferably includes one or more linearly extendable members [40] such as a hydraulic cylinder of FIG. 2a. The hydraulic cylinder has first and second ends, and first and second connection affordances respectively at these ends. As illustrated in FIG. 3, the hydraulic cylinder (as a linearly extendable member) is connected to the base at a first attachment site by its first connection affordance and connected to the slidable platform by a second connection affordance at a second attachment site displaced along the slide direction from the first connection affordance.

Figure 8C:
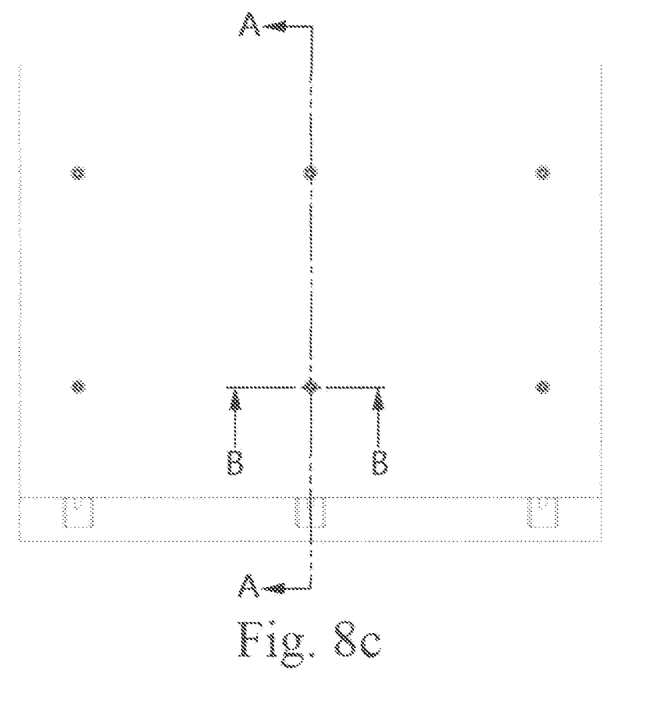
FIG. 8c shows a top view of the slidable assembly of FIG. 8a and defines section line A-A for cross section views 9a and 9b, and section line B-B for cross section views 10a, 10b, and 10c.

FIG. 8c shows a top view of the slidable assembly of FIG. 8a and defines section line A-A for cross section views 9a and 9b, and section line B-B for cross section views 10a, 10b, and 10c.

Figure 9A:
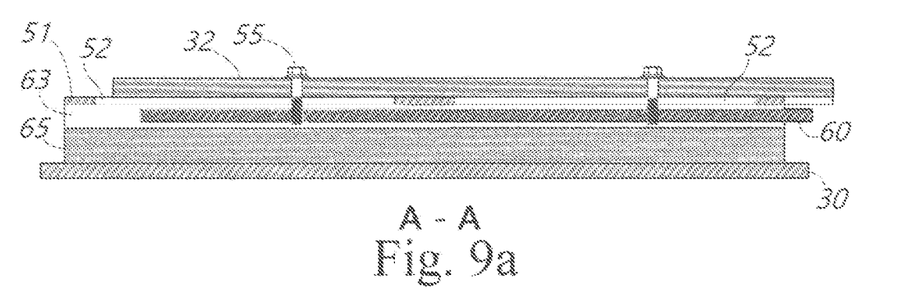
FIG. 9a shows a cross section view of the slidable assembly of FIG. 8a taken at section A-A of FIG. 8c, with the clamp bar in a loosened position.

FIG. 9a shows a cross section view of the slidable assembly of FIG. 8a taken at section A-A of FIG. 8c, with the clamp bar [60] in a loosened position residing in a hollow cavity [65] in the joist. This condition allows the platform [32] to slide in a slide direction (leftward and rightward in this view) with respect to the base [30.] The fasteners [55] pass through apertures in the platform and pass through slots [52] in the support surfaces [51] of the joists.

Figure 9B:
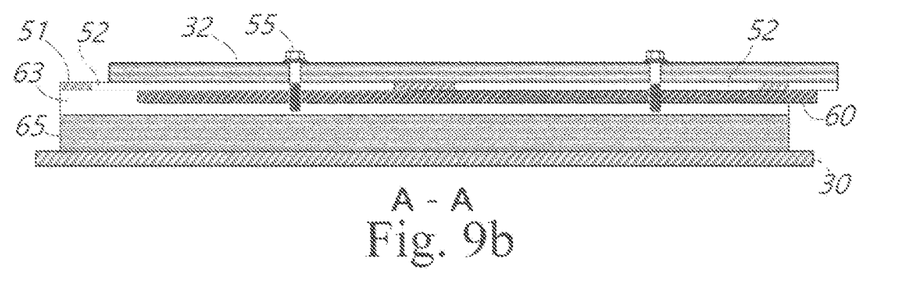
FIG. 9b shows a cross section view of the slidable assembly of FIG. 8a taken at section A-A of FIG. 8c, with the clamp bar in a tightened position.

FIG. 9b shows a cross section view of the slidable assembly of FIG. 8a taken at section A-A of FIG. 8c, with the clamp bar in a tightened position. The base, platform, joist features, fastener and clamp bar are numbered similarly as in FIG. 9a. However in this condition shown the tension in the fasteners squeezes the clamp bar tightly against the ceiling of the cavity in the joist, and also pulls the supported surfaces of the platform down securely onto the support surfaces of the joists, so that equipment secured to the platform may resist displacement from lateral forces.

Figure 10A:
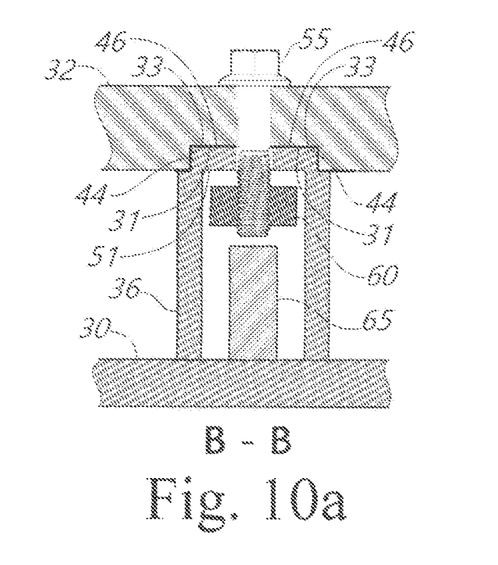
FIG. 10a shows a cross section view of the slidable assembly of FIG. 8a taken at section B-B of FIG. 8c, with the clamp bar in a loosened position.

FIG. 10a shows a cross section view of the slidable assembly of FIG. 8a taken at section B-B of FIG. 8c, with the clamp bar [60] in a loosened position. The joist is a hollow section, and the clamp bar rest [65] is attached to the base [30] such as by welding. The clamp bar rest keeps the fastener receiving apertures of the clamp bar within easy reach of the threaded end of the fastener [55,] so that if the fastener is removed and replaced it remains easy for a user to rotate the fastener, feel for engagement in the receiving threads, and thread the fastener into the clamp bar as a blind operation.

The joist [36] may be built up by welding flat strips together, or by forming a channel, or by extrusion, The joist includes two walls spaced apart by a gap and has a lintel [51] or a "roof" spanning across the gap and capping the top of the walls. The clamp bar resides within this gap. The lintel provides a top surface which is a support surface [31] for the sliding platform [32.] The lateral faces of the lintel provide guide surfaces [33] extending along the slide direction so that the platform is slidably coupled to the base by means of its joists and their guide surfaces.

A channel cut into the underside of the sliding platform provides a supported surface [46] that rests upon the lintel. Lateral control of the sliding of the platform is provided by the guide surfaces residing within guided surfaces [44] which are the side faces of the channel cut into the platform and complementary to and in contact with the guide surfaces of the lintel of the joist.

In this embodiment, lateral excursion of the platform is prevented because the two guide surfaces of the lintel outwardly oppose each other, and the two complementary guided surfaces of the platform are channel sidewalls which oppose and face each other.

Figure 10B:
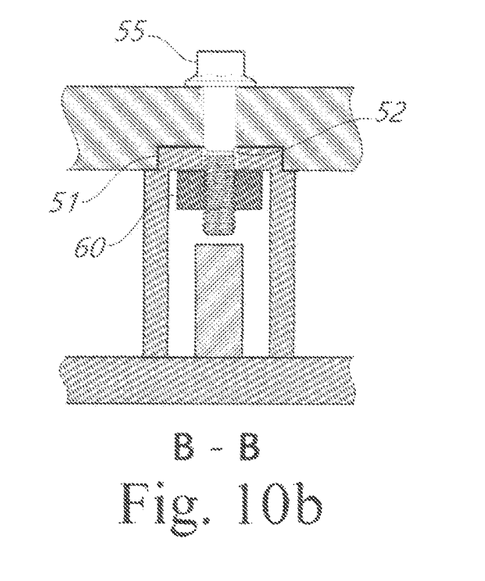
FIG. 10b shows a cross section view of the slidable assembly of FIG. 8a taken at section B-B of FIG. 8c, with the clamp bar in a tightened position.

FIG. 10b shows a cross section view of the slidable assembly of FIG. 8a taken at section B-B of FIG. 8c, with the clamp bar [60] in a tightened position. The fastener [55] draws up the clamp bar residing in the cavity of the joist. The lateral faces of the slot [52] in the lintel [51] also act as opposed guide surfaces, and the fastener gliding within the slot also acts as a guided surface.

Figure 10C:
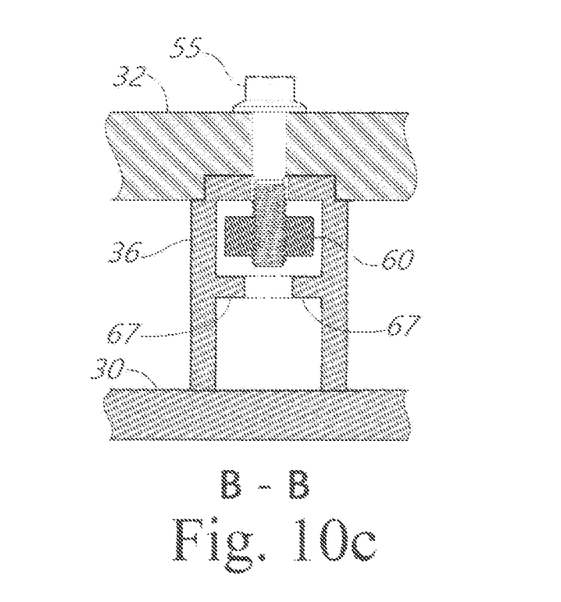
FIG. 10c shows a cross section view of the slidable assembly of FIG. 8a taken at section B-B of FIG. 8c, with the clamp bar in a loosened position and with an alternative embodiment of a clamp bar rest.

FIG. 10c shows a cross section view of the slidable assembly of FIG. 8a taken at section B-B of FIG. 8c, with the clamp bar [60] in a loosened position and with an alternative embodiment of a clamp bar rest which is a part of the joist. In this embodiment the clamp bar rest comprises horizontal ribs within the cavity or gap of the joist The ribs may extend partway across and leave their own gap between them as shown, or the rest may be a continuous horizontal web spanning all the way across the gap, such as if the joist is built up from an H-channel or a wide flange I-channel lying on its side. The continuous web version of a clamp bar rest is shown as a phantom line.

While certain features and aspects have been described with respect to exemplary embodiments, one skilled in the art will recognize that numerous modifications are possible. Also, while certain functionality is ascribed to certain system components, unless the context dictates otherwise, this functionality may be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Furthermore, the procedures described with respect to one method or process may be incorporated within other described methods or processes; likewise, system components described according to a particular structural configuration and/or with respect to one system may be organized in alternative structural configurations and/or incorporated within other described systems.

The present disclosure is not to be limited in terms of the particular embodiments described in this specification, which are intended as illustrations of various aspects. Many modifications and variations may be made without departing from its spirit and scope. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled.

Hence, while various embodiments are described with or without certain features for ease of description and to illustrate exemplary aspects of those embodiments, the various components and/or features described herein with respect to a particular embodiment may be substituted, added, and/or subtracted from among other described embodiments, unless the context dictates otherwise. Thus, unauthorized instances of apparatuses and methods claimed herein are to be considered infringing, no matter where in the world they are advertised, sold, offered for sale, used, possessed, or performed.

Consequently and in summary, although many exemplary embodiments are described above, it will be appreciated that the invention is intended to cover all modifications and equivalents within the scope of the following claims.

What is claimed is:

1. A slidable assembly comprising:
a base having a joist extending along a slide direction, said joist further comprising
   a support surface,
   a cavity extending along said slide direction, and
   a slot communicating with said cavity and extending along said slide direction, and
   at least one guide surface,
a platform slidably coupled to said base, said platform further comprising
   a supported surface having an aperture,
   at least one guided surface complementary to and in contact with said guide surface of said joist,
a clamp bar deposited within said cavity, said clamp bar further comprising a fastener receiving aperture, and
a fastener passed through said aperture in said supported surface and through said slot and received within said fastener receiving aperture.

2. The slidable assembly of claim 1, further comprising
a linearly extendable member having first and second ends and first and second connection affordances respectively at said ends,
said linearly extendable member connected to said base at a first attachment site by said first connection affordance, and connected to said slidable platform by said second connection affordance at a second attachment site displaced along said slide direction from said first connection affordance.

3. The slidable assembly of claim 1, wherein
said guide surface is a first of two opposed guide surfaces and
said guided surface is a first of two opposed guided surfaces complementary to said two guide surfaces.

4. The slidable assembly of claim 1, wherein said supported surface further comprises a runnel.

5. The slidable assembly of claim 1, wherein said cavity in said joist further comprises a clamp bar rest.

6. The slidable assembly of claim 1, wherein said fastener comprises external threads and said thread receiving aperture comprises internal threads.

7. The slidable assembly of claim 4, wherein said runnel is a first runnel among a plurality of runnels, with said first runnel intersecting and communicating with a second runnel.

8. The slidable assembly of claim 5, wherein said clamp bar rest is attached to said base.

9. A slidable assembly comprising
a base further comprising at least one joist extending along a slide direction, said joist further comprising two walls spaced apart by a gap and
   a lintel comprising
      a guide surface extending along said slide direction,
      a support surface, and
      a slot elongated along said slide direction,
a platform further comprising a channel extending along said slide direction, said channel comprising a supported surface and a guided surface, and a through aperture,
a clamp bar deposited within said gap, said clamp bar further comprising a fastener receiving aperture, and
a fastener passed through said through aperture in said supported surface and through said slot and received within said fastener receiving aperture.

10. The slidable assembly of claim 9, further comprising
a linearly extendable member having first and second ends and first and second connection affordances respectively at said ends,
said linearly extendable member connected to said base at a first attachment site by said first connection affordance, and connected to said slidable platform by said second connection affordance at a second attachment site displaced along said slide direction from said first connection affordance.

11. The slidable assembly of claim 9, wherein
said guide surface is a first of two opposed guide surfaces and
said guided surface is a first of two opposed guided surfaces complementary to said two guide surfaces.

12. The slidable assembly of claim 9, wherein a supported surface further comprises a runnel.

13. The slidable assembly of claim 9, wherein said gap in said joist further comprises a clamp bar rest.

14. The slidable assembly of claim 9, wherein said fastener comprises external threads and said thread receiving aperture comprises internal threads.

15. The slidable assembly of claim 12, wherein said runnel is a first runnel among a plurality of runnels, with said first runnel intersecting and communicating with a second runnel.

16. The slidable assembly of claim 13, wherein said clamp bar rest is attached to said base.

* * * * *